(12) United States Patent
Maeda et al.

(10) Patent No.: US 6,842,610 B2
(45) Date of Patent: Jan. 11, 2005

(54) TUNER

(75) Inventors: Yoji Maeda, Shiga-ken (JP); Akimasa Matsushima, Omihachiman (JP); Yoshikazu Shimamura, Ritto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 610 days.

(21) Appl. No.: 09/996,990

(22) Filed: Nov. 30, 2001

(65) Prior Publication Data

US 2002/0101291 A1 Aug. 1, 2002

(30) Foreign Application Priority Data

Jan. 9, 2001 (JP) ........................................ 2001-001705
Sep. 28, 2001 (JP) ........................................ 2001-300623

(51) Int. Cl.[7] .............................. H04B 1/06; H04B 7/00; H04B 1/18; H04B 1/26; H04B 15/00
(52) U.S. Cl. .................... 455/260; 455/131; 455/189.1; 455/197.1; 455/315; 455/340
(58) Field of Search ................................ 455/130, 131, 455/150.1, 154.1, 160.1, 173.1, 180.3, 182.3, 189.1, 190.1, 192.3, 197.1, 197.2, 315, 316, 340

(56) References Cited

U.S. PATENT DOCUMENTS

| 4,726,072 A | * | 2/1988 | Yamashita et al. ........ 455/189.1 |
| 5,428,829 A | * | 6/1995 | Osburn et al. ............ 455/197.1 |
| 6,549,766 B2 | * | 4/2003 | Vorenkamp et al. ......... 455/307 |
| 6,591,091 B1 | * | 7/2003 | Vorenkamp et al. ...... 455/179.1 |
| 6,684,065 B2 | * | 1/2004 | Bult et al. ................ 455/252.1 |
| 6,696,898 B1 | * | 2/2004 | Ward et al. ............. 331/116 FE |
| 6,744,320 B2 | * | 6/2004 | Nguyen et al. ............. 330/254 |
| 6,759,904 B2 | * | 7/2004 | Behzad ........................ 330/254 |

* cited by examiner

Primary Examiner—Binh Tieu
(74) Attorney, Agent, or Firm—Keating & Bennett LLP

(57) ABSTRACT

A tuner includes an input terminal, first to fourth band-pass filters, an automatic gain controller, first to third amplifiers, first and second mixers, first and second voltage controlled oscillators, first and second PLL ICs, a reference oscillator circuit, and an output terminal. The second PLL IC and the reference oscillator circuit are connected through a capacitor and an amplifier. An amplifier for reference oscillation, included in the first PLL IC is connected to the reference oscillator circuit through an inductor that defines an inductance device.

30 Claims, 2 Drawing Sheets

TUNER

BACKGROUND OF THE INVENTION

1. Field of the Invention

The present invention relates to tuners, and more particularly, to a tuner that prevents a reference frequency signal from being superposed as a disturbance signal on a local oscillating signal.

2. Description of the Related Art

In CATV, programs for several tens of channels can be transmitted by re-transmitting a broadcasting wave, a vacant channel, a middle band, and a super band. In such CATV, since both signal scrambling and transmission of necessary information are performed to select a program and perform accounting, a double-conversion tuner is placed before a receiver to perform receiving.

FIG. 3 is a block diagram of a tuner related to the present invention. A tuner 50 is provided with an input terminal 1, first to fourth band-pass filters 2a to 2d, an automatic gain controller 3, first to third amplifiers 4a to 4c, first and second mixers 5a and 5b, first and second voltage controlled oscillators 6a and 6b, first and second PLL ICs 7a and 7b, a reference oscillator circuit 8, and an output terminal 9.

The tuner 50 is a double-conversion type, in which the frequency of an input signal is increased by an upconverter and then, decreased by a downconverter to remove disturbance.

The operation of the tuner 50 will be described next. An input signal input to the input terminal 1 is attenuated at frequencies other than those in the frequency band of a desired receiving signal by a first bandpass filter 2a, limited to a predetermined level range by an automatic gain controller 3 according to an automatic-gain-control voltage based on the receiving-signal level, amplified by a first amplifier 4a, and sent to a first mixer 5a. The first mixer 5a converts the input signal to a first intermediate-frequency signal according to a first local oscillating signal output from the first voltage controlled oscillator 6a. In this case, the oscillating frequency of the first voltage controlled oscillator 6a is controlled and stabilized by a first PLL circuit included in the first PLL IC 7a.

The first intermediate-frequency signal output from the first mixer 5a is attenuated at frequencies other than those in a first intermediate-frequency band by the second bandpass filter 2b, amplified by the second amplifier 4b, attenuated again at frequencies other than those in the first intermediate-frequency band, and sent to the second mixer 5b. The second mixer 5b converts the input first intermediate-frequency signal to a second intermediate-frequency signal according to a second local oscillating signal output from the second voltage controlled oscillator 6b. In this case, the oscillating frequency of the second voltage controlled oscillator 6b is controlled and stabilized by a second PLL circuit included in the second PLL IC 7b. The second intermediate-frequency signal output from the second mixer 5b is attenuated at frequencies other than those in a second intermediate-frequency band by the fourth bandpass filter 2d, amplified by the third amplifier 4c, and output from the output terminal 9.

The first PLL IC 7a and the reference oscillator circuit 8 are directly connected, and the second PLL IC 7b and the reference oscillator circuit 8 are connected through a capacitor C2 and an amplifier AMP. The reference oscillator circuit 8 includes a crystal oscillator X and a capacitor C1, and sends a reference-frequency signal oscillated by a reference oscillating circuit including the reference oscillator circuit 8 and an amplifier included in the first PLL IC 7a, to the first voltage controlled oscillator 6a. The reference-frequency signal is also sent to the second PLL IC 7b through the capacitor C2 and the amplifier AMP.

In the tuner described above, the first voltage controlled oscillator, the reference oscillator circuit, and the first PLL IC, which includes the amplifier for reference oscillation, are located close to each other in a cabinet due to recent demands for compactness. In such a case, the first local oscillating signal flows undesirably into the amplifier from a connection terminal between the reference oscillator circuit and the first PLL IC. The reference-frequency signal is mixed with the first local oscillating signal or the first local oscillating signal is superposed on the reference-frequency signal. The mixed or superposed signal is added to the first voltage controlled oscillator through the first PLL IC. Since the oscillating frequency of a crystal oscillator in the reference oscillator circuit usually falls in the 4-MHz band, the mixed or superposed signal has two frequencies that are equal to that of the first local oscillating signal frequency ±4 MHz. Because the frequencies of the signal fall in an analog-video-system transmission bandwidth, 6 MHz, the signal functions as a disturbance wave and reduces the image quality of CATV.

SUMMARY OF THE INVENTION

In order to overcome the problems described above, preferred embodiments of the present invention provide a tuner that effectively prevents a reference oscillating signal from mixing into the oscillating signal of a voltage controlled oscillator.

According to one preferred embodiment of the present invention, a tuner includes a reference oscillating circuit having a reference oscillator circuit and an amplifier, a voltage controlled oscillator, a PLL circuit for comparing in phase the oscillating signal of the reference oscillating circuit and the oscillating signal of the voltage controlled oscillator and for controlling the oscillating frequency of the oscillating signal of the voltage controlled oscillator according to a result of the comparison made by the PLL circuit, and a mixer for converting an input signal to an intermediate-frequency signal in frequency according to the oscillating signal of the voltage controlled oscillator, wherein an inductance device is connected between the reference oscillator circuit and the amplifier to pass the oscillating signal of the reference oscillating circuit and to block the oscillating signal of the voltage controlled oscillator.

In another preferred embodiment of the present invention, a tuner includes a reference oscillating circuit having a reference oscillator circuit and an amplifier, a voltage controlled oscillator, a PLL circuit for comparing in phase the oscillating signal of the reference oscillating circuit and the oscillating signal of the voltage controlled oscillator and for controlling the oscillating frequency of the oscillating signal of the voltage controlled oscillator according to a result of the comparison made by the PLL circuit, and a mixer for converting an input signal to an intermediate-frequency signal in frequency according to the oscillating signal of the voltage controlled oscillator, wherein a filter is connected between the reference oscillator circuit and the amplifier to pass the oscillating signal of the reference oscillating circuit and to block the oscillating signal of the voltage controlled oscillator.

In accordance with another preferred embodiment of the present invention, a tuner includes a reference oscillating circuit, a voltage controlled oscillator, a PLL circuit for comparing in phase the oscillating signal of the reference oscillating circuit and the oscillating signal of the voltage controlled oscillator and for controlling the oscillating frequency of the oscillating signal of the voltage controlled oscillator according to a result of comparison made by the PLL circuit, and a mixer for converting an input signal to an intermediate-frequency signal in frequency according to the oscillating signal of the voltage controlled oscillator, wherein an inductance device is connected between the reference oscillating circuit and the PLL circuit to pass the oscillating signal of the reference oscillating circuit and to block the oscillating signal of the voltage controlled oscillator.

In yet another preferred embodiment of the present invention, a tuner includes a reference oscillating circuit, a voltage controlled oscillator, a PLL circuit for comparing in phase the oscillating signal of the reference oscillating circuit and the oscillating signal of the voltage controlled oscillator and for controlling the oscillating frequency of the oscillating signal of the voltage controlled oscillator according to a result of the comparison made by the PLL circuit, and a mixer for converting an input signal to an intermediate-frequency signal in frequency according to the oscillating signal of the voltage controlled oscillator, wherein a filter is connected between the reference oscillating circuit and the PLL circuit to pass the oscillating signal of the reference oscillating circuit and to block the oscillating signal of the voltage controlled oscillator.

According to a tuner of various preferred embodiments of the present invention, since an inductance device or a filter for passing a reference-frequency signal and for blocking the oscillating signal of a voltage controlled oscillator is connected between a reference oscillator circuit and an amplifier circuit, or between a reference oscillating circuit and a PLL circuit, the reference-frequency signal is reliably and effectively prevented from being superposed as a disturbance signal on the oscillating signal of the voltage controlled oscillator.

According to a tuner of various preferred embodiments of the present invention, since an inductance device or a filter for passing a reference-frequency signal and for blocking the oscillating signal of a voltage controlled oscillator is connected between a reference oscillator circuit and an amplifier circuit included in a PLL IC, the oscillating signal of the voltage controlled oscillator is prevented from being superposed as a disturbance signal on the reference-frequency signal transmitted from a reference oscillating circuit formed of the reference oscillator circuit and the amplifier included in the PLL circuit, to the voltage controlled oscillator. As a result, the reference-frequency signal is prevented from being superposed as a disturbance signal on the first local oscillating signal.

Therefore, even when a voltage controlled oscillator, a reference oscillator circuit, and a PLL IC are located close to each other due to recent requirements for compactness, the image quality of CATV is not deteriorated.

Other features, elements, characteristics and advantages of the present invention will become more apparent from the detailed description of preferred embodiments below with reference to the attached drawings.

DETAILED DESCRIPTION OF PREFERRED EMBODIMENTS

Figure 1:
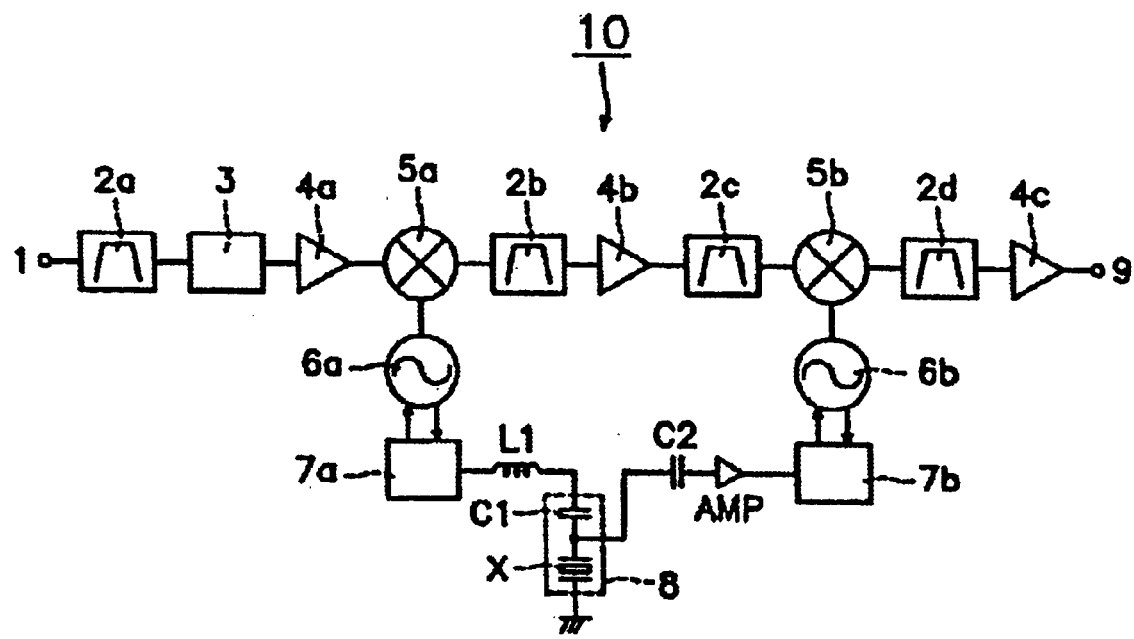
FIG. 1 is a block diagram of a tuner according to a first preferred embodiment of the present invention.

Preferred embodiments of the present invention will be described with reference to the attached drawings. The same reference numerals as those used to describe the related tuner above will be used to represent the same elements in the present invention described below.

FIG. 1 is a block diagram of a tuner according to a first preferred embodiment of the present invention. A tuner 10 preferably includes an input terminal 1, first to fourth band-pass filters 2a to 2d, an automatic gain controller 3, first to third amplifiers 4a to 4c, first and second mixers 5a and 5b, first and second voltage controlled oscillators 6a and 6b, first and second PLL ICs 7a and 7b, a reference oscillator circuit 8, and an output terminal 9, in the same way as the tuner 50 in the related device described above.

The second PLL IC 7b and the reference oscillator circuit 8 are connected through a capacitor C2 and an amplifier AMP in the same way as the tuner 50 in the related device described above. An amplifier built in the first PLL IC 7a is connected to the reference oscillator circuit 8 through an inductor L1, which defines an inductance device.

The reference oscillator circuit 8 and the amplifier built in the first PLL IC 7a define a reference oscillating circuit.

The inductor L1 is preferably defined by a printing pattern, and its inductance is as small as about 15 nH so as to block the oscillating signal of the first voltage controlled oscillator 6a. More specifically, the impedance of the inductor L1 is preferably about 0.38Ω at the oscillating frequency (4 MHz) of the reference oscillating circuit and is preferably about 141.31Ω at the oscillating frequency (1.5 GHz) of the first voltage controlled oscillator 6a.

Figure 2:
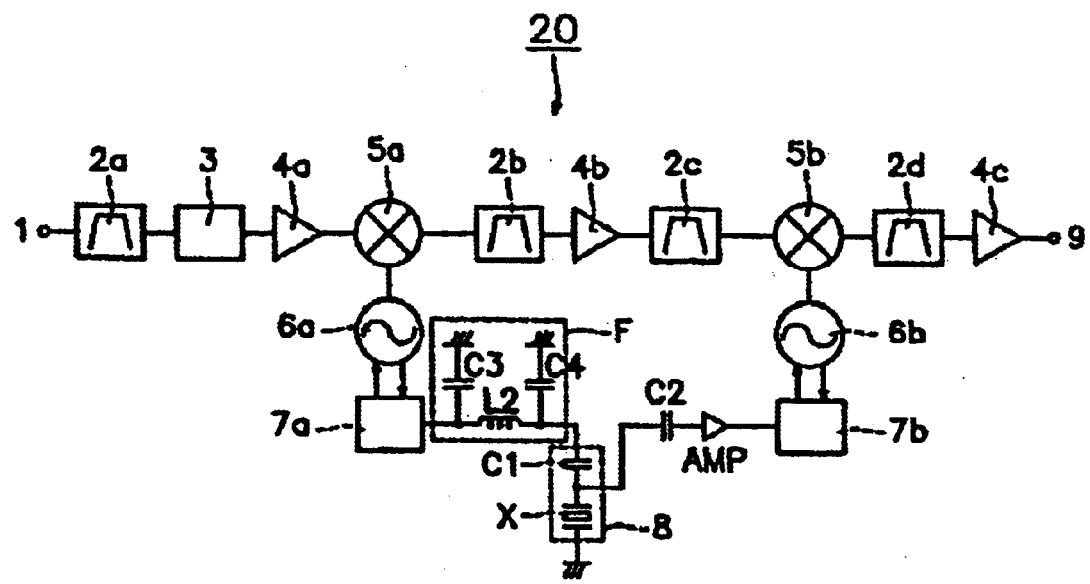
FIG. 2 is a block diagram of a tuner according to a second preferred embodiment of the present invention.
Figure 3:
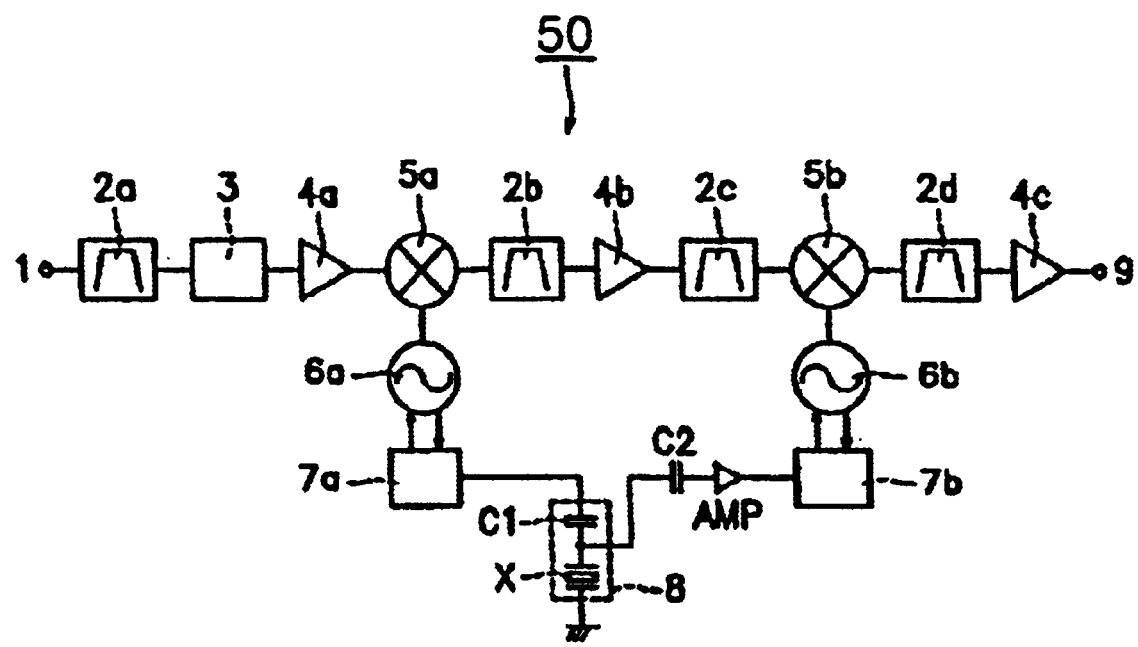
FIG. 3 is a block diagram of a related tuner.

FIG. 2 is a block diagram of a tuner according to a second preferred embodiment of the present invention. A tuner 20 differs from the tuner 10 (shown in FIG. 1) of the first preferred embodiment in that the first PLL IC 7a and the reference oscillating circuit 8 are connected through a low-pass filter F defined by an inductor L2 and capacitors C3 and C4.

Similar to the tuner 10 (shown in FIG. 1) of the first preferred embodiment, the reference oscillator circuit 8 and an amplifier built in the first PLL IC 7a define a reference oscillating circuit.

The inductance of the inductor L2 and the capacitances of the capacitors C3 and C4 are constructed so as to pass the oscillating signal (4 MHz) of the reference oscillating circuit and to block the oscillating signal (1.5 GHz) of the first voltage controlled oscillator 6a.

According to the tuners of the above-described preferred embodiments, the inductance device or the filter is connected between the reference oscillator circuit and the amplifier built in the first PLL IC so as to pass the oscillating signal of the reference oscillating circuit and so as to block the oscillating signal of the first voltage controlled oscillator 6a, which is a first local oscillating signal. Therefore, the first local oscillating signal is prevented from being superposed as a disturbance wave on the reference-frequency signal. As a result, the reference frequency signal is prevented from being superposed as a disturbance wave on the first local oscillating signal.

Therefore, even when a voltage controlled oscillator and a reference oscillator circuit are located close to each other due to recently demanded compactness, the image quality of CATV is not deteriorated.

In the above-described preferred embodiments, the tuners are preferably double-conversion tuners but may be other type of tuners such as single-conversion tuners. Even when the tuners are single-conversion tuners, the same advantages are obtained.

In the above-described preferred embodiments, the inductances are preferably defined by printing patterns but may be defined by other suitable elements. Even when the inductances are defined by chip coils or air-core coils, for example, the same advantages are obtained.

In the above-described preferred embodiments, the low-pass filter is preferably used but other filters such as a band-pass filter or a band-elimination filter. Even when a band-pass filter which passes the reference frequency signal but blocks the first local oscillating signal is used, or a band-elimination filter which blocks only the first local oscillating signal is used, the same advantages are obtained.

In each of the above-described preferred embodiments, the first PLL IC preferably includes the amplifier used for the reference oscillating circuit. Even when the amplifier used for the reference oscillating circuit is externally connected to the first PLL IC, the same operations and the same advantages are obtained.

When the amplifier used for the reference oscillating circuit is not included in the first PLL IC, the output of the reference oscillating circuit defined by the reference oscillator circuit and the amplifier is input to the first PLL IC. When an inductance device or a filter is connected between the reference oscillating circuit and the first PLL IC, the same operations and the same advantages are obtained.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A tuner comprising:
   a reference oscillating circuit having a reference oscillator circuit and an amplifier;
   a voltage controlled oscillator;
   a PLL circuit for comparing in phase an oscillating signal of the reference oscillating circuit and an oscillating signal of the voltage controlled oscillator and for controlling an oscillating frequency of the oscillating signal of the voltage controlled oscillator according to a result of the comparison made by the PLL circuit;
   a mixer for converting an input signal to an intermediate-frequency signal in frequency according to the oscillating signal of the voltage controlled oscillator; and
   an inductance device connected between the reference oscillator circuit and the amplifier to pass the oscillating signal of the reference oscillating circuit and to block the oscillating signal of the voltage controlled oscillator.

2. The tuner according to claim 1, further comprising an input terminal, first to fourth band-pass filters, an automatic gain controller, first to third amplifiers, first and second mixers, first and second voltage controlled oscillators, first and second PLL ICs, a reference oscillator circuit, and an output terminal.

3. The tuner according to claim 2, wherein the second PLL IC and the reference oscillator circuit are connected via the capacitor and one of the amplifiers.

4. The tuner according to claim 2, wherein an amplifier is disposed in the first PLL IC and is connected to the reference oscillator circuit through an inductance device.

5. The tuner according to claim 4, wherein the reference oscillator circuit and the amplifier built in the first PLL IC define a reference oscillating circuit.

6. The tuner according to claim 2, wherein the inductance device includes a printed pattern and is arranged to block the oscillating signal of the first voltage controlled oscillator.

7. The tuner according to claim 1, wherein the tuner is a double-conversion tuner.

8. A tuner comprising:
   a reference oscillating circuit having a reference oscillator circuit and an amplifier;
   a voltage controlled oscillator;
   a PLL circuit for comparing in phase an oscillating signal of the reference oscillating circuit and an oscillating signal of the voltage controlled oscillator and for controlling an oscillating frequency of the oscillating signal of the voltage controlled oscillator according to a result of the comparison made by the PLL circuit;
   a mixer for converting an input signal to an intermediate-frequency signal in frequency according to the oscillating signal of the voltage controlled oscillator;
   filter connected between the reference oscillator circuit and the amplifier to pass the oscillating signal of the reference oscillating circuit and to block the oscillating signal of the voltage controlled oscillator.

9. The tuner according to claim 8, wherein the filter is a low-pass filter including an inductor and capacitors.

10. The tuner according to claim 8, wherein the filter is one of a low-pass filter, a band-pass filter and a band-elimination filter.

11. The tuner according to claim 8, further comprising an input terminal, first to fourth band-pass filters, an automatic gain controller, first to third amplifiers, first and second mixers, first and second voltage controlled oscillators, first and second PLL ICs, a reference oscillator circuit, and an output terminal.

12. The tuner according to claim 11, wherein the second PLL IC and the reference oscillator circuit are connected via the capacitor and one of the amplifiers.

13. The tuner according to claim 11, wherein an amplifier is disposed in the first PLL IC and is connected to the reference oscillator circuit through an inductance device.

14. The tuner according to claim 13, wherein the reference oscillator circuit and the amplifier built in the first PLL IC define a reference oscillating circuit.

15. The tuner according to claim 1, wherein the tuner is a double-conversion tuner.

16. A tuner comprising:
    a reference oscillating circuit;
    a voltage controlled oscillator;
    a PLL circuit for comparing in phase the oscillating signal of the reference oscillating circuit and the oscillating signal of the voltage controlled oscillator and for controlling the oscillating frequency of the oscillating signal of the voltage controlled oscillator according to a result of the comparison made by the PLL circuit;
    a mixer for converting an input signal to an intermediate-frequency signal in frequency according to the oscillating signal of the voltage controlled oscillator; and
    an inductance device connected between the reference oscillating circuit and the PLL circuit to pass the oscillating signal of the reference oscillating circuit and to block the oscillating signal of the voltage controlled oscillator.

17. The tuner according to claim 16, further comprising an input terminal, first to fourth band-pass filters, an automatic gain controller, first to third amplifiers, first and second mixers, first and second voltage controlled oscillators, first and second PLL ICs, a reference oscillator circuit, and an output terminal.

18. The tuner according to claim 17, wherein the second PLL IC and the reference oscillator circuit are connected via the capacitor and one of the amplifiers.

19. The tuner according to claim 17, wherein an amplifier is disposed in the first PLL IC and is connected to the reference oscillator circuit through an inductance device.

20. The tuner according to claim 19, wherein the reference oscillator circuit and the amplifier built in the first PLL IC define a reference oscillating circuit.

21. The tuner according to claim 17, wherein the inductance device includes a printed pattern and is arranged to block the oscillating signal of the first voltage controlled oscillator.

22. The tuner according to claim 16, wherein the tuner is a double-conversion tuner.

23. A tuner comprising:
a reference oscillating circuit;
a voltage controlled oscillator;
a PLL circuit for comparing in phase the oscillating signal of the reference oscillating circuit and the oscillating signal of the voltage controlled oscillator and for controlling the oscillating frequency of the oscillating signal of the voltage controlled oscillator according to a result of the comparison made by the PLL circuit; and
a mixer for converting an input signal to an intermediate-frequency signal in frequency according to the oscillating signal of the voltage controlled oscillator; and
a filter connected between the reference oscillating circuit and the PLL circuit to pass the oscillating signal of the reference oscillating circuit and to block the oscillating signal of the voltage controlled oscillator.

24. The tuner according to claim 23, wherein the filter is a low-pass filter including an inductor and capacitors.

25. The tuner according to claim 23, wherein the filter is one of a low-pass filter, a band-pass filter and a band-elimination filter.

26. The tuner according to claim 23, further comprising an input terminal, first to fourth band-pass filters, an automatic gain controller, first to third amplifiers, first and second mixers, first and second voltage controlled oscillators, first and second PLL ICs, a reference oscillator circuit, and an output terminal.

27. The tuner according to claim 26, wherein the second PLL IC and the reference oscillator circuit are connected via the capacitor and one of the amplifiers.

28. The tuner according to claim 26, wherein an amplifier is disposed in the first PLL IC and is connected to the reference oscillator circuit through an inductance device.

29. The tuner according to claim 28, wherein the reference oscillator circuit and the amplifier built in the first PLL IC define a reference oscillating circuit.

30. The tuner according to claim 23, wherein the tuner is a double-conversion tuner.

* * * * *